(No Model.)
W. T. CLAYCOMB.
TURN PLOW AND DOUBLE SHOVEL FRAME.
No. 334,847. Patented Jan. 26, 1886.
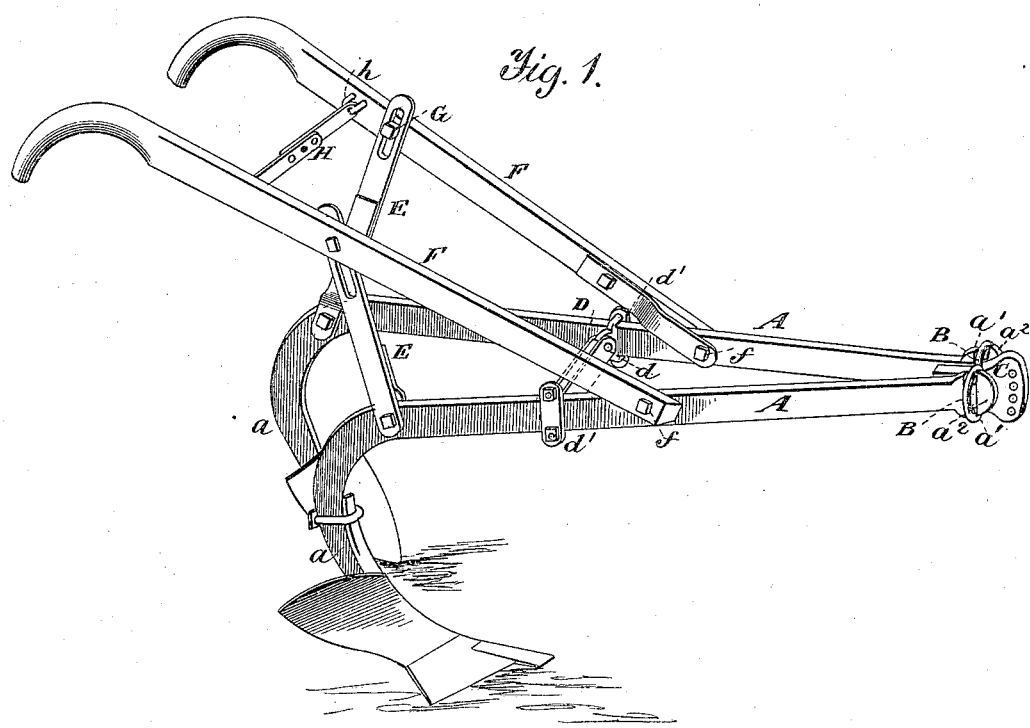
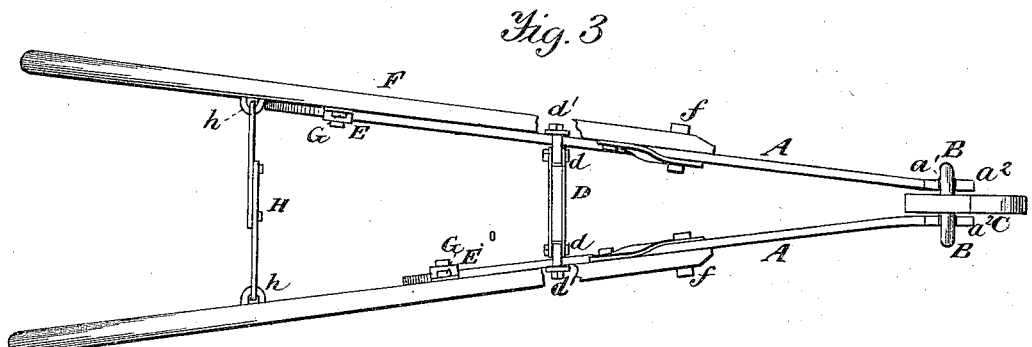
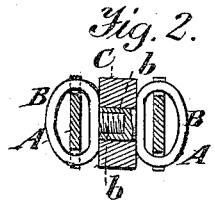
Witnesses.
A. Ruppert,
Alfred T. Gage.
Inventor:
Wm. T. Claycomb,
Per
Thomas P. Simpson,
Attorney.

UNITED STATES PATENT OFFICE.

WILLIAM THOMAS CLAYCOMB, OF STEPHENSPORT, KENTUCKY.

TURN-PLOW AND DOUBLE-SHOVEL FRAME.

SPECIFICATION forming part of Letters Patent No. 334,847, dated January 26, 1886.

Application filed March 10, 1885. Serial No. 158,319. (No model.)

*To all whom it may concern:*

Be it known that I, WM. T. CLAYCOMB, of Stephensport, in the county of Breckenridge and State of Kentucky, have invented an Improved Frame for Double Shovel or Turn Plows, of which the following is a specification.

The special object of this invention is not only to obtain a frame whose two parts are flexible, but so that either plow or shovel may be separately and independently turned laterally by the particular hand which holds and guides it, so as to change the position of one without affecting that of the other plow or shovel.

Figure 1 of the drawings is a perspective view of a frame exhibiting my invention and containing in this instance turning-plows. Fig. 2 is a detail view showing the way in which I combine the beams, their end connection, and the draft-clevis. Fig. 3 is a plan view of the two beams, showing the relative location of the two connections by which they are held so as to admit of an independent lateral movement.

In the drawings, A A represent two corresponding beams turned at the rear end, so as to form standards $a$ $a$ for the shovel or turn plows. These beams are constructed at the front end, so as to form journals $a'$ $a'$. Caps $a^2$ $a^2$ may be left, or detachable screw-caps may be employed, or any other device adapted to the same purpose. These journal ends are connected by the bearings B B, which are intermediately held together by bolts $b$ $b$—one screwing into the other—which at the same time hold the draft-clevis C in a median position.

D represents a bar, in each end of which is formed a bearing for one of the pintles $d$ on the hinge-straps $d'$, the latter being rigidly fastened to the beams, as shown in Fig. 1 of the drawings.

E E represent upright bars, extending up from the beams and slotted near the top, so that the handles F F may be connected therewith by a screw-clamp, G, at different elevations to suit the varying heights of the plowmen. For this purpose the handles F are pivoted to the beams at $f$, and to allow of their independent movement by the hand which holds each one, the cross-piece H is hinged at $h$ $h$ similarly to the hinges $d$ $d'$, by which the cross-bar D is held.

By this construction a double shovel or plow may be much more conveniently and easily used between rows of plants or in straddling said rows, any damage to the plants being readily prevented without lifting either plow or shovel out of the ground or into a position whereby it may leave some portion of the ground uncultivated. Either plow may be laterally turned by a motion of the hand.

Having thus described all that is necessary to a full understanding of my invention, what I claim as new and of my invention, and desire to protect by Letters Patent, is specified in the following claims:

1. In frames for two shovels or two turn-plows, the beams A A, journaled at their front ends in bearings B B, to turn laterally, as and for the purpose set forth.

2. The combination of two beams, A A, constructed at their front ends, as shown at $a'$ $a^2$, the bearings B B, the intermediate draft-clevis, C, and the bolts $b$ $b$, substantially as shown and described.

3. The combination, with the draft-clevis C, of the bearings B B, connected by a male and female screw working in said clevis, as shown and described.

WILLIAM THOS. CLAYCOMB.

Witnesses:
J. C. BRASHEAR,
J. W. JARRETT.